(12) United States Patent
Zawadka

(10) Patent No.: US 12,304,163 B2
(45) Date of Patent: May 20, 2025

(54) SYSTEM FOR STAMPING A THICK THERMOPLASTIC COMPOSITE BLANK

(71) Applicant: DAHER AEROSPACE, Orly (FR)

(72) Inventor: Laurent Zawadka, Sainte Pazanne (FR)

(73) Assignee: DAHER AEROSPACE, Orly (FR)

( * ) Notice: Subject to any disclaimer, the term of this patent is extended or adjusted under 35 U.S.C. 154(b) by 0 days.

(21) Appl. No.: 18/376,114

(22) Filed: Oct. 3, 2023

(65) Prior Publication Data

US 2025/0010559 A1    Jan. 9, 2025

(51) Int. Cl.
*B29C 70/54*      (2006.01)
*B29C 70/46*      (2006.01)

(52) U.S. Cl.
CPC ............ *B29C 70/543* (2013.01); *B29C 70/46* (2013.01)

(58) Field of Classification Search
CPC ..... B29C 51/262; B29C 55/20; B29C 70/541; B29C 43/02; B29C 43/34; B29C 2043/3405
See application file for complete search history.

(56) References Cited

U.S. PATENT DOCUMENTS

| | | | |
|---|---|---|---|
| 2,700,179 A | 1/1955 | Benson | |
| 3,476,377 A | 11/1969 | Agrista et al. | |
| 10,639,840 B2 * | 5/2020 | Zawadka | B29C 59/026 |
| 10,773,470 B2 * | 9/2020 | Vaudour | B29C 59/005 |
| 2016/0288405 A1 | 10/2016 | Zawadka | |
| 2017/0001383 A1 | 1/2017 | Vaudour | |
| 2021/0379845 A1 * | 12/2021 | Abou-Assali Rodríguez | B29C 70/38 |

FOREIGN PATENT DOCUMENTS

EP      3065931 B1      5/2019

* cited by examiner

*Primary Examiner* — Michael A Tolin
*Assistant Examiner* — Hana C Page

(57) ABSTRACT

The invention relates to a stamping apparatus comprising:
- a trimmed thermoplastic composite blank (100);
- a transfer frame (200) capable of supporting the blank;
- a stamping device comprising a stamping die and a movable punch;

wherein:
- the blank (100) comprises positioning bore holes (121, 122) configured to cooperate with centering pins (212) carried by the transfer frame (200) and oblong slots (125, 126) configured to cooperate with guiding pins attached to the stamping die;
- the transfer frame (200) comprises a comb-shaped supporting member (220) and holding pegs cooperating with holding slots (130); and
- the transfer frame (200) comprises hinged thermally protecting flaps (214) configured to cover the blank around the positioning bore holes (121, 122, 123, 124)

7 Claims, 6 Drawing Sheets

SYSTEM FOR STAMPING A THICK THERMOPLASTIC COMPOSITE BLANK

RELATED APPLICATIONS

This application claims priority from French Patent Application No. 2210167 fled on Oct. 5, which is incorporated herein by reference in its entirety.

TECHNICAL FIELD

The invention relates to a system for stamping a composite blank with a thermoplastic matrix and continuous reinforcing fibers. More particularly, the invention pertains to the manufacture by stamping of thick and relatively heavy composite parts comprising local reinforcement over thicknesses.

BACKGROUND ART

Stamping is a forming technique for making thermoplastic matrix composite parts reinforced with continuous fibers, i.e. comprising at least one reinforcing fiber extending without interruption from one end of the part to another end of the part.

Document EP 1 543 942 describes an exemplary implementation of a stamping method suitable for the manufacture of thermoplastic matrix composite parts.

A blank of adapted shape is cut-out from a consolidated or partially consolidated composite plate, then the blank is brought to a melting temperature of the polymer making the matrix of the composite, the blank thus deconsolidated is then stamped between a punch and a stamping die before being cooled and reconsolidated into shape between said punch and said stamping die.

The difficulty of this method lies in the ability to transfer the blank into a heating zone, then once the temperature of the blank has been raised to the melting point of the polymer, while the blank has very little cohesion, to transfer it to the stamping station while ensuring precise positioning of said blank with respect to the stamping tooling.

According to a technique of the prior art, the blank is laid on a heat-resistant polyimide film. This polyimide film serves as a support for the blank and its transfer from one implementation station to another.

Thus, in a first station, the blank, laying on the film, is heated, in particular by radiant panels, in order to bring the polymer making the matrix of the blank to a temperature equal to or greater than its melting point.

At such a temperature, the blank is deconsolidated and its rigidity is very low. Since the polymer making the matrix is in a liquid state, it does not hinder the relative displacement of the reinforcing fibers.

The deconsolidated blank is brought above a tooling, in this case a die, then the blank, still on the polyimide film, is stamped by a punch pushing the blank and the film against the walls of the stamping die.

The blank and the film are then contained in an air gap delimited by the walls of the stamping matrix and the walls of the punch. A cooling cycle makes it possible to reconsolidate the part in shape while the thickness of the finished part is calibrated through the control of the air gap.

This method of the prior art has several shortcomings, in particular the one that the polyimide film which is stamped at the same time as the blank and which is likely to wrinkle during this operation. The wrinkles following this wrinkling are printed in the polymer making the matrix of the composite part.

Another disadvantage of this method is that it is not possible to precisely locate the blank with respect to the stamping tooling (punch and stamping die), the blank simply being laid on the polyimide film without any positioning means.

Document EP 3 065 931 describes an improvement to the method exposed above, in which the blank is transported from a heating station to a stamping station on a holding frame, which holding frame comprises means for precisely positioning the blank on the holding frame and means for precisely positioning the holding frame with respect to the stamping tooling.

The seek for mass reduction, particularly in the aeronautics field, leads to the design of parts and in particular composite parts, integrating more and more functions without assembly.

This leads to the manufacturing of larger parts, thicker so as to bear higher forces, and with local reinforcements to improve their resistance for a given mass.

Blanks for making such parts reach 15 kg or more, with thicknesses reaching 15 mm or more.

Such masses lead to significantly higher heating times to obtain the deconsolidation of the blank, typically in the order 20 minutes instead of a maximum of 5 minutes for the blanks of parts made by the method of the prior art.

The combination of a long heating time and the mass of the blank to be supported do not allow the arrangements of the transfer frame described in EP 3 065 931 to be fully effective.

SUMMARY OF THE INVENTION

The invention aims at solving the shortcomings of the prior art and to this end pertains to a stamping system comprising: —a trimmed blank comprising continuous reinforcing fibers in a thermoplastic polymer matrix; —a transfer frame configured to hold the blank along at least two edgings of said blank and comprising an open area between these edgings; —a stamping device comprising a stamping die and a punch movable with respect to the stamping die between an open position and a closed position, the closed position defining an air gap between walls of the stamping die and walls of the punch; —means for moving the transfer frame above the stamping die to a first position above a resting surface of the stamping die and a second position below the resting surface and wherein the blank rests on the resting surface of the stamping die; wherein: —the blank comprises on one of the at least two edgings at least two positioning bore holes configured to cooperate with two centering pins carried by the transfer frame; —the blank comprises two oblong slots configured to cooperate with at least two guiding pins attached to the die; —the transfer frame comprises a comb-shaped support member comprising a plurality of teeth configured to support the blank on a holding surface extending along another of the at least two edgings of the blank and holding pegs protruding from the end of the teeth of the comb-shaped support member and perpendicular to the holding surface; the blank comprises holding slots configured to cooperate with the holding pegs of the comb-shaped support member; a perimeter of the stamping die in a plane parallel to the resting surface is contained in the open area of the transfer frame; and the transfer frame comprises thermal protection hinged flaps, configured to cover the blank and the centering pins around the positioning bore holes when the blank is laid on the transfer frame.

Thus, the transfer frame defines a precise positioning area of the blank via the centering pins which area is protected by the thermal protection flaps and is not deconsolidated during heating, while the comb-shaped member supports the blank and prevents it from sagging under its own weight during long heating operations without preventing the blank from deconsolidating on its edging in contact with the support member.

The invention is advantageously implemented according to the embodiments and alternatives exposed hereafter, which are to be considered individually or according to any technically operative combination.

The system is more particularly suitable in the case where a thickness of the blank is equal to or greater than 10 mm.

According to an embodiment, the blank comprises thickness variations. The positioning means allow these thickness variations to be perfectly positioned relative to the stamping die and the punch.

According to an embodiment, the mass of the blank is greater than 5 kg. Indeed, the system of the invention is adapted to any type of blank intended for stamping but is particularly advantageous in the case of heavy and thick blanks.

By combining high thicknesses (thicker than 10 mm) and thickness variations, the system of the invention is particularly suitable for the manufacture of composite parts integrating many functions and makes it possible to reduce the mass of these parts as well as manufacturing times, in particular by avoiding assemblies.

According to an advantageous embodiment, the blank comprises two pairs of positioning bore holes, cooperating with 2 pairs of centering pins and wherein the oblong slots are located between two positioning bore holes in each pair of positioning bore holes, the thermal protection flaps being configured to be pushed away from the blank by the action of the guiding pins attached to the stamping die, through the oblong slots, when the transfer frame moves from the first position to the second position relative to the stamping die.

Advantageously, the transfer frame is built of an assembly of metal profiles and comprises a rail configured to hold the cleats adjustable in position on said rail, each cleat comprises a bearing surface and two centering pins configured for being inserted into the positioning bore holes of the blank. Thus, the system is modular and adaptable to a large number of blanks of various dimensions.

Advantageously, each cleat comprises a platelet with a thickness substantially equal to the thickness of the blank capable of thermally protecting as edging of the blank at the level of the cleat when the blank is laid on the transfer frame.

BRIEF DESCRIPTION OF THE DRAWINGS

The invention is implemented according to the preferred embodiments, in no way limiting, exposed hereafter with reference to FIGS. 1 to 8 in which:

FIG. 3 is a perspective view of an exemplary embodiment of a stamping die;

DESCRIPTION OF EMBODIMENTS

Figure 1:
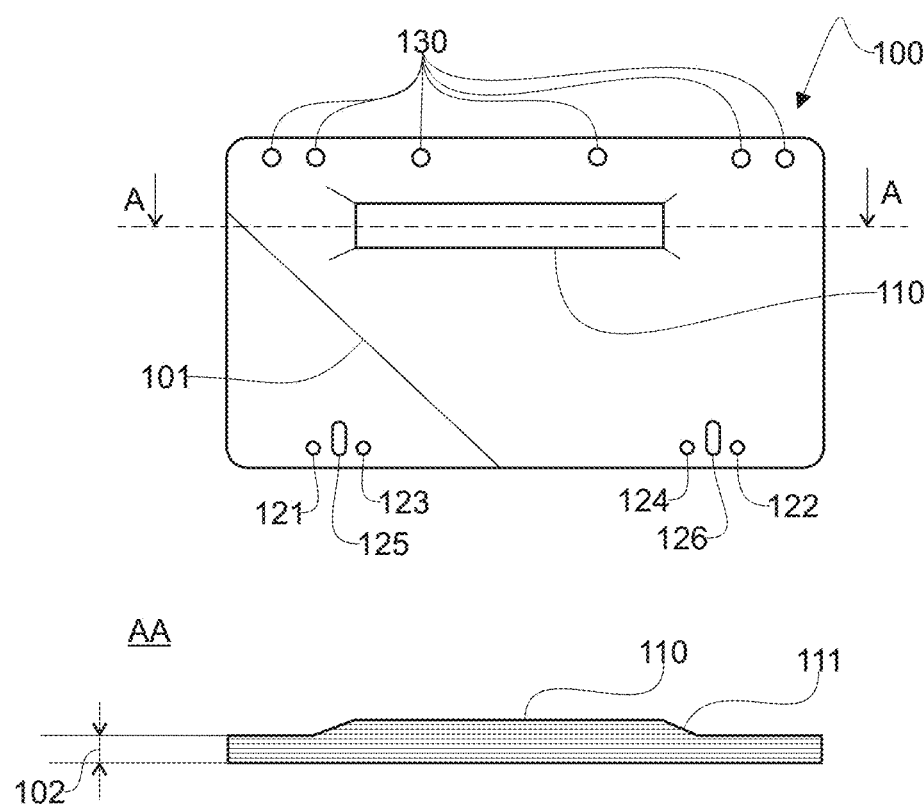
FIG. 1 shows in a top view and an AA sectional view defined in this same figure an exemplary embodiment of a blank comprising a thickness variation.

FIG. 1 according to an exemplary embodiment, the system of the invention is a stamping apparatus comprising comprising a blank (100) intended to be shaped by stamping. According to this exemplary embodiment, the blank is trimmed along a rectangular contour but in practice the latter is trimmed along a contour adapted to the shape of the final part to be obtained.

The blank (100) is a ply laminate composite, some or all of the plies comprising continuous fibers (101) extending seamlessly from one edge to the other of the outline of the blank.

The continuous fibers are included as unidirectional plies deposited by automated fiber placement, by the layup non-woven unidirectional fibers or so-called unidirectional fabrics, or in fabric plies.

The sequence of lamination and orientation of the fibers in the plies depends on the end use.

The blank (100) may be cut-out from a pre-consolidated plate comprising a thermoplastic polymer matrix and obtained, for instance, by means of the method described in documents EP 2 819 823 or EP 2 064 050.

Alternatively, the blank may be obtained from a partially consolidated preform obtained by automated fiber placement as described in documents US 2018/319102 or U.S. Pat. No. 10,016,931.

The trimming is carried out by high-pressure abrasive water jet, by cutting tool routing or by any other technique known from the prior art.

The thickness (102) of the blank is typically greater than or equal to 10 mm and according to an exemplary embodiment, the blank comprises one or more reinforcement areas (110) of greater thickness and comprising a degressive thickness on the edges of the reinforcement in the form of ply drop-offs (111), so that the blank comprises variations in thickness.

Typically, the mass of the blank (100) is 5 kg or more.

The blank comprises at least two positioning bore holes (121, 122) configured to cooperate with centering pins as explained below.

Advantageously, the positioning bore holes are arranged in pairs (121, 123; 122, 124), and an oblong slot (125, 126) is implemented between each pair.

These arrangements: positioning bore holes (121, 122, 123, 124) and oblong slots (125, 126), are machined in a first edging (104) of the blank.

A second edging (103) opposite said arrangements, the blank comprises holding slots (130) configured to cooperating with holding pegs as described below.

Positioning bore holes (121, 122, 123, 124), oblong slots (125, 126) and holding slots (130) are machined by drilling, milling, abrasive water jet cutting or any other suitable techniques.

Figure 2:
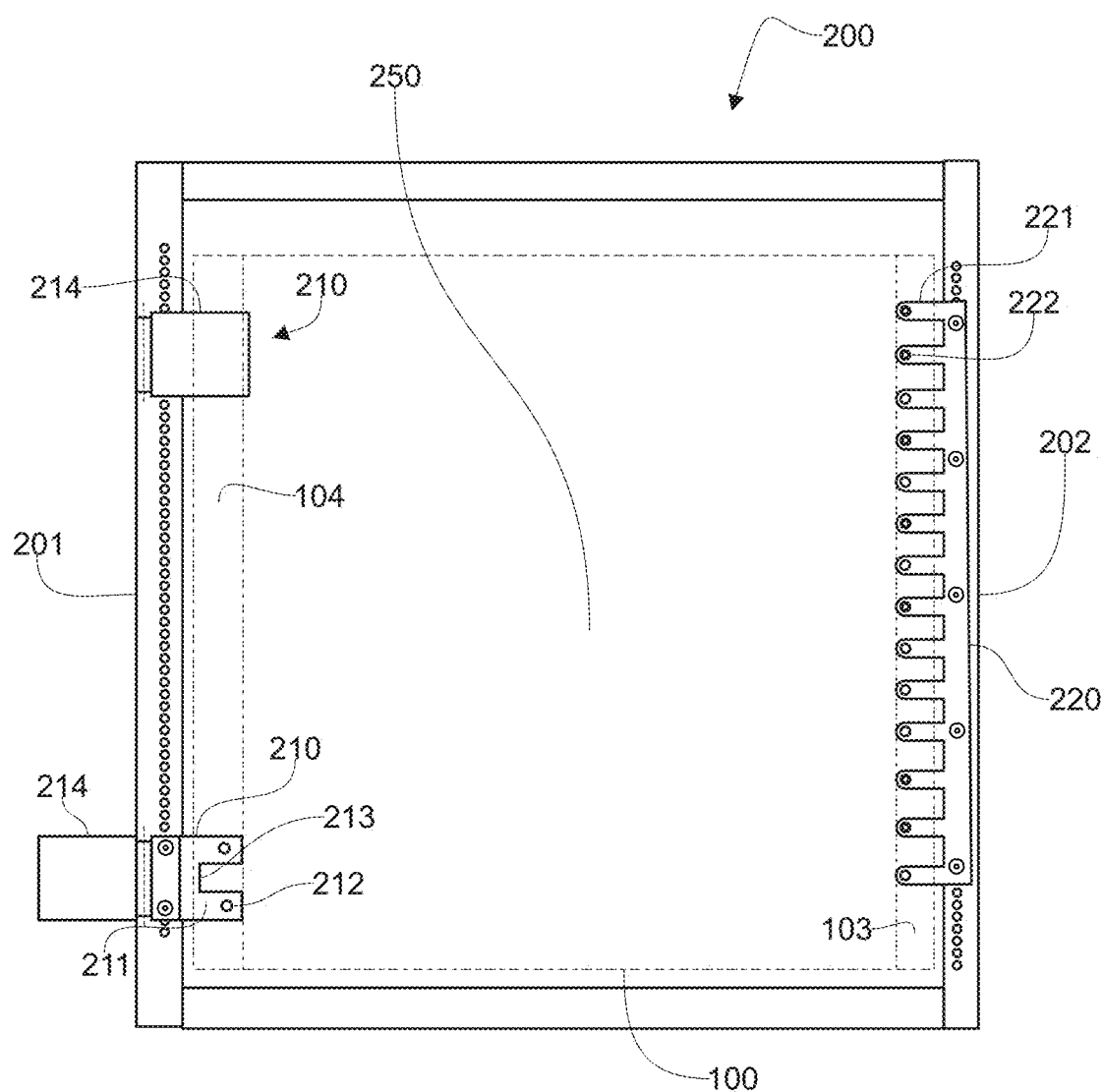
FIG. 2 represents seen from the top exemplary simplified embodiment of the transfer frame showing how the blank is positioned on said frame.

FIG. 2 The apparatus of the invention comprises a transfer frame (200) configured to holding the blank between the stations performing the different steps of a stamping process.

According to an exemplary embodiment, the transfer frame is made of an assembly of metal profiles, for example angle-irons.

At least one of the profiles is a rail (201) configured to hold cleats (210) in adjustable positions on said rail.

Each cleat (210) comprises a bearing surface (211), at least one centering pin (212) and preferably two centering pins configured to be insertable into the positioning bore holes of the blank.

According to this embodiment, the cleat (210) comprises a notch (213) in the bearing surface (211) so that the oblong slot of the blank is not covered by said bearing surface when the blank is laid on the transfer frame.

Each cleat comprises a thermal protection flap (214) hinged with respect to the portion forming the bearing surface of the cleat, so that said thermal protection flap (214) can cover, in a closed position, a portion of the blank overing an area substantially equal to the bearing surface.

FIG. 2 depicts a cleat where the thermal protection flap is in an open position and a cleat where the thermal protection flap (214) is in a closed position, then covering an area of the blank and the centering pins in that area.

The transfer frame comprises at least one comb-shaped support member (220) attached to a rail (202) on a side opposite the rail (201) holding the cleats.

The comb-shaped support member (220) comprises a plurality of teeth (221) some of these teeth bearing a holding peg (222).

FIG. 2 all the teeth (221) of the comb-shaped support member are of the same lengths but, according to other embodiments, the teeth of the comb may be of different lengths to be adapted to the contour of the blank.

The blank (100) whose position is represented in mixed lines [FIG. 2] rests on the transfer frame (200) by at least two edgings, a first edging (104) on the bearing surfaces (211) of the cleats and a second edging (103) on the support surface of the teeth (221) of the comb-shaped support member (220), while the features described above: the positioning bore holes and the retaining slots, cooperate respectively with centering pins (212) of the cleats and the holding pegs (222) set on certain teeth (221) of the comb-shaped support member (220).

FIG.2 the blank is shown laying on the transfer frame (200) on two of its edgings (104, 103), depending on the embodiment and on the shape of the blank, the latter can rest on the transfer frame on several of its edgings, and said transfer frame may comprise more than two rails bearing cleats or a comb-shaped support member.

The cleats and the means they carry enable a precise positioning of the blank with respect to the frame and then with respect to the stamping tooling as explained below.

The comb-shaped support member supports the blank without a positioning function. Also, a diameter of the holding pegs is smaller than a diameter of the holding slots of the blank, to avoid any statically redundant positioning of the blank on the frame.

The teeth of the comb-shaped support member as well as the bearing surfaces of the cleats extend substantially perpendicular to the rails making the transfer frame and towards the interior of said frame.

Thus, when a blank is not resting on the transfer frame, the frame delimits an open area (250) free from any obstacles.

Figure 3:
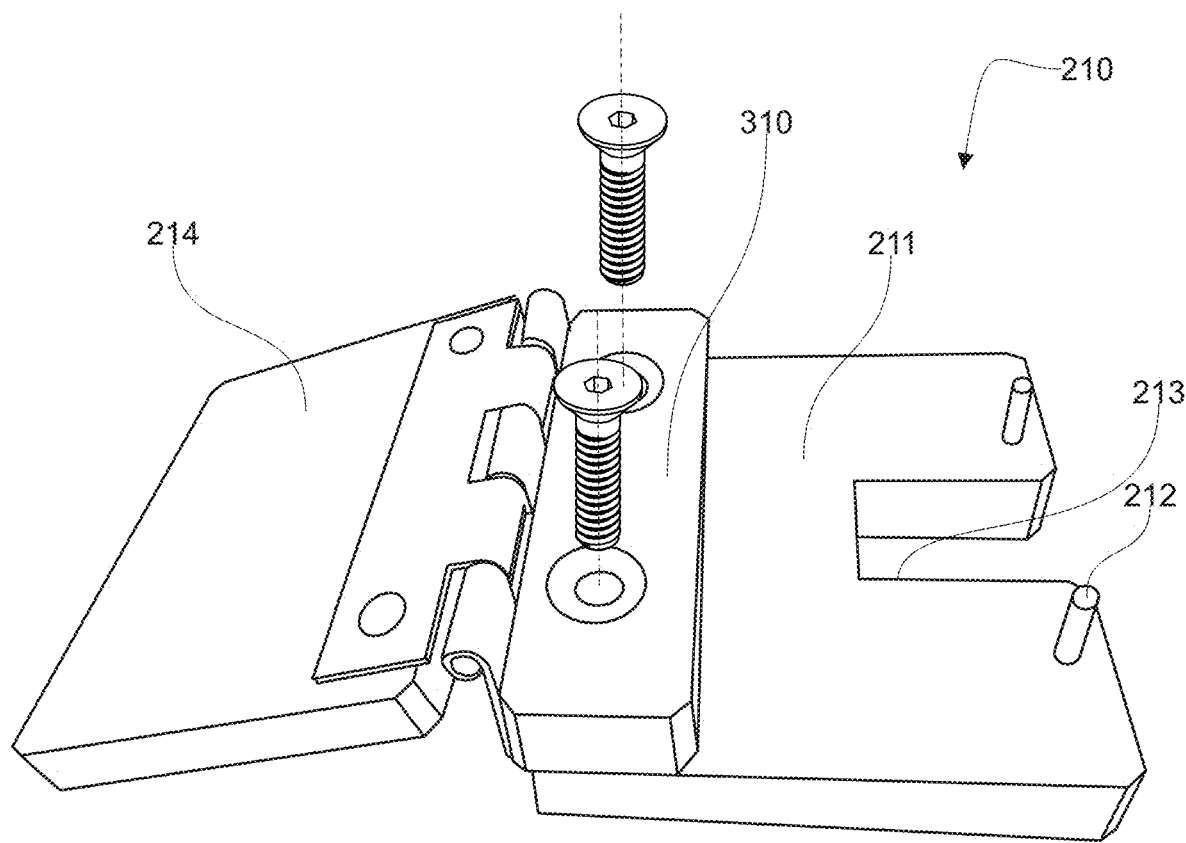
FIG. 3 is a perspective view of an exemplary embodiment of a cleat.

FIG. 3 according to an exemplary embodiment, the cleat is made of thick steel, typically of the order of 15 mm, of a grade selected so that it remains stable during heating of the blank and constituting a heat sink maintaining the blank area where the blank bears on the cleat at a temperature lower than a melting temperature of the polymer making the matrix.

The thermal protection flap (214) is made of steel with a thickness of around 10 mm and acts as a thermal screen of this area during heating prior to the stamping of the blank.

According to this exemplary embodiment, a platelet (310), with a thickness substantially equal to the thickness of the blank, enables the cleat to be fixed on the rail of the transfer frame at a defined location. The platelet (310) also protects the edging of the blank resting on the cleat from the thermal radiation of the heating means so as to make sure that the area covered by the thermal protection flap is not deconsolidated.

The comb-shaped support member is made of steel with a thickness less than that of the cleat, in the order of 4 mm. The comb-shaped support member acts as a support, but unlike the cleat, does not provide a heat sink function. The contact of the blank on the comb-shaped support member is reduced to the contact surface with the teeth thereof, in order to minimize heat transmission by conduction during the heating of the blank and to make sure that the temperature of the blank actually reaches a melting temperature in the edging in contact with the comb-shaped support member during the heating.

Figure 4:
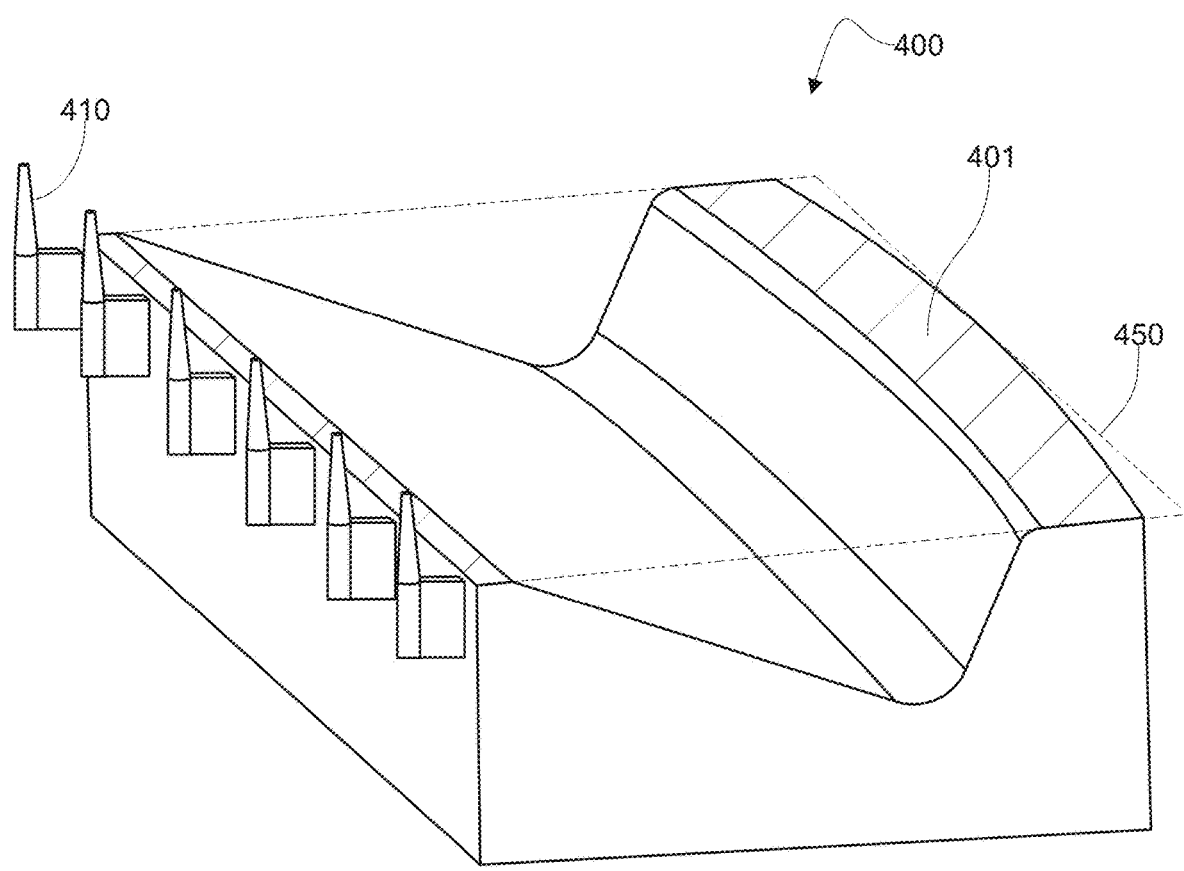

FIG. 4 the stamping die of the stamping tooling comprises a resting surface (401), hatched in the figure, and on which the blank rests before the action of the punch and its shaping by stamping.

At a level of the resting surface (401) and below this surface, the stamping matrix is comprised within a perimeter (450).

Returning to FIG. 2 the profiles constituting the transfer frame are adjusted, according to the characteristics of the tooling implementing the stamping operation so that the perimeter of the stamping die can be fit in the open area (250) free of any obstacle and delimited by the transfer frame.

The stamping die may comprise outside this perimeter a plurality of guiding pins (410), for instance in a shape of conical pins, and fixed to one of the outer faces of the stamping die (400).

Figure 5:
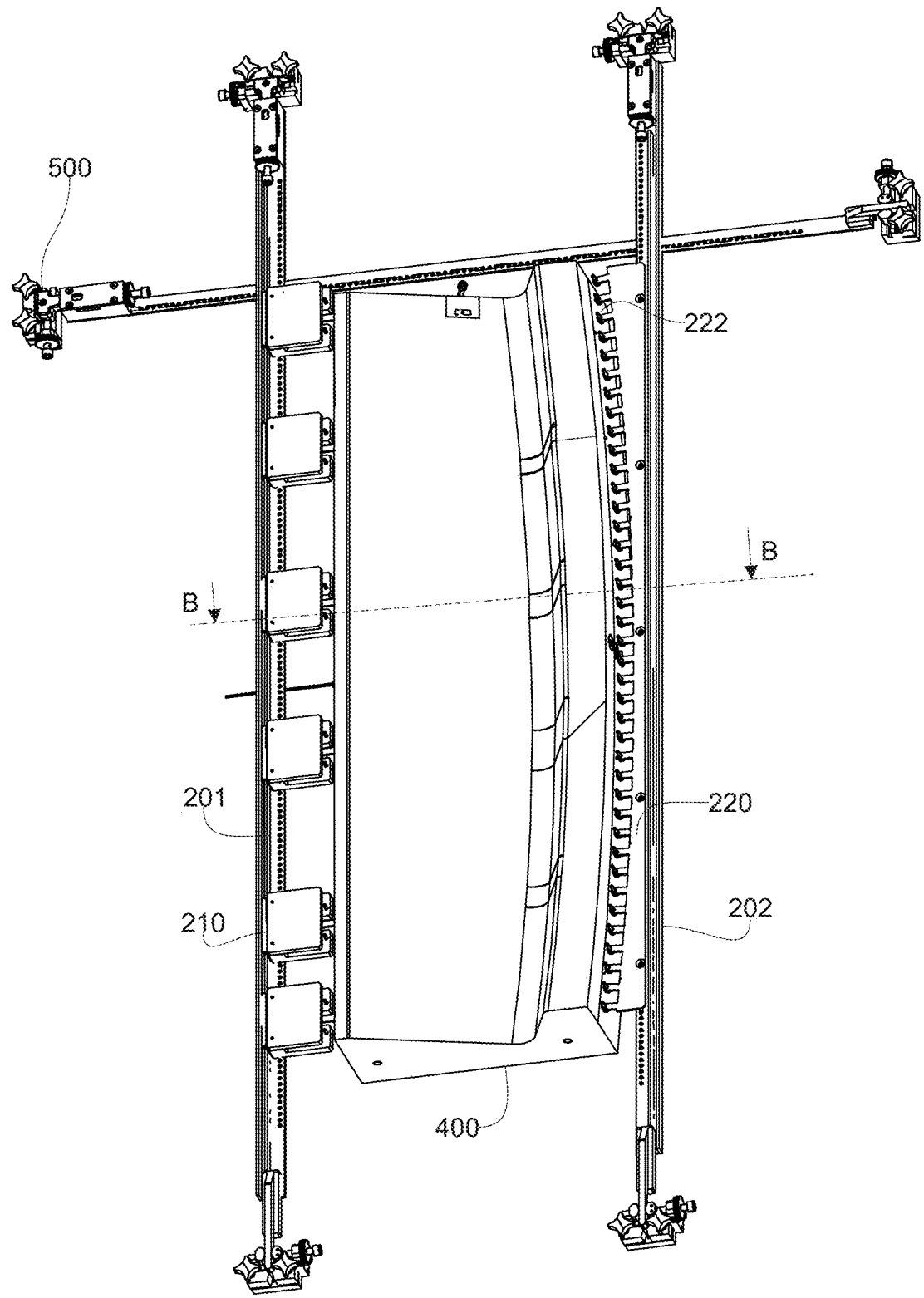
FIG. 5 shows, viewed from the top, an exemplary embodiment showing a transfer frame adapted to the die of FIG. 4.

FIG. 5 shows the positioning of the frame with respect to the stamping die just before the stamping starts.

The transfer frame comprises connectors (500) for connecting it to a guide system so as to move it from one station to another during the stamping operation.

Figure 6:
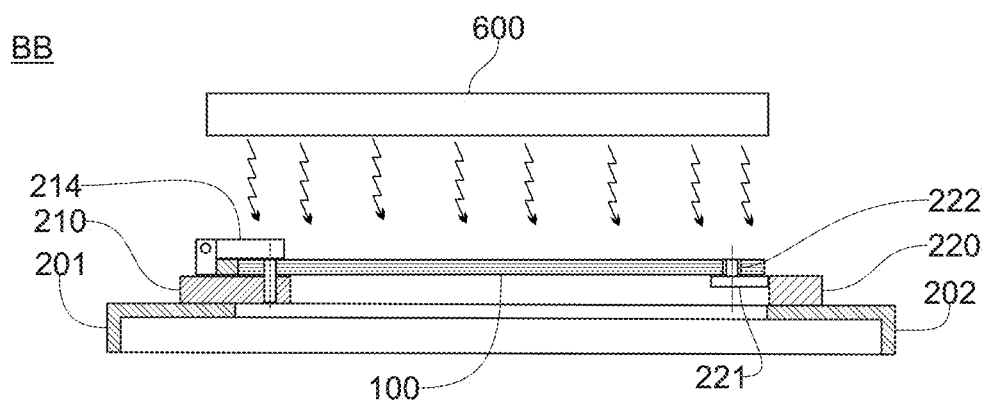
FIG. 6 is a view in cross section according to BB defined in FIG. 5 of the implementation of the system of the invention during a blank heating step.

FIG. 6 the blank (100) laying on the transfer frame and the thermal protection flaps (214) being closed above the cleats (210), the transfer frame is brought under a heater (600), for example radiant panels.

This heating device brings the blank (100) to a temperature at least equal to and preferably higher by 5° C. to 10° C. than a melting point of a thermoplastic polymer making the matrix of the composite.

Heated to such a temperature the polymer is in a pasty state, the blank is deconsolidated and exhibits only a weak cohesion.

The heating operation, given the thickness and the mass of the blank, may last several tens of minutes. The entire volume of the blank is brought to this temperature except for the areas located on the cleats (210), which remain at a temperature lower than this melting temperature, due to the heat sink effect of the cleats (210) and the screen to the radiation created by the thermal protection flaps (214). Thus, these areas are not deconsolidated and provide solid hooks of the blank to the transfer frame.

The heat sink effect of the comb-shaped support member (220) is reduced compared to that produced by the cleats (210) due to the reduced contact area with the teeth. Thus, the edgings of the blank that are in contact with the comb-shaped support member are also brought to a melting temperature of the polymer upon heating and deconsolidated.

However, the support provided by the teeth (221) and the holding pegs (222), combined with the hooking provided by the cleats, make it possible to hold the blank on the transfer frame although said blank is deconsolidated and tends to sag under its own weight.

The deconsolidated blank (100) and the transfer frame assembly is moved above the stamping die (400), in a position corresponding to FIG. 5.

Figure 7:
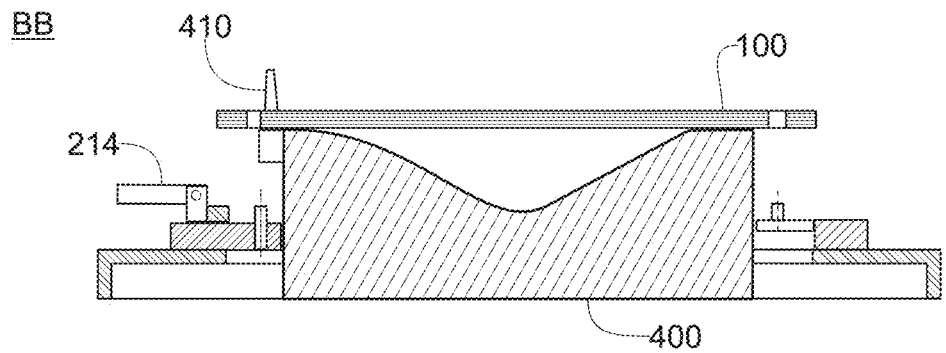
FIG. 7 shows according to the same BB cross section a step of transferring the blank, from the transfer frame to the stamping die.

FIG. 7 the transfer frame is retracted by lowering it along the die the latter inserting through the opening area of the frame. In doing so, the blank (100) now rests on the resting surface of the stamping die (400).

In this retraction move, the blank (100) is also released from the comb-shaped member and holding pegs.

The guiding pins (410) attached to the stamping die penetrate into the oblong slots of the blank, said oblong slots being located in the non-deconsolidated areas of the blank and uncovered because of the notches opened in the cleats.

By penetrating in the oblong slots, the guiding pins (410) push the thermal protection flaps (214) by lifting them to avoid any interference with the blank during its stamping.

The guiding pins being conical in shape, they carry out a guiding function with a low clearance in the width of the oblong slots when the blank rests on the resting surface of the die.

Figure 8:
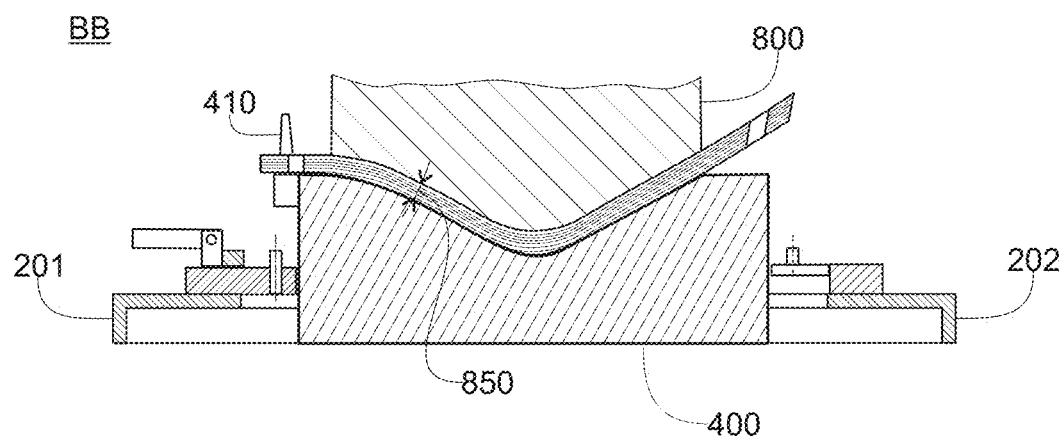
FIG. 8 represents, according to the same BB cross section, the implementation of the device of the invention during the stamping step.

FIG. 8 the blank is stamped by bringing the punch (800) closer to the stamping die (400). Because the continuous fibers reinforcing the blank are not capable of plastic deformation, forming occurs by interlaminar slipping of the plies constituting the composite.

This interlaminar slipping does not occur in areas that are not deconsolidated, i.e. areas that were on the cleats and under the thermal protection flaps at the time the blank was heated. However, since the guiding pins are in oblong slots, these do not prevent the blank from sliding on the resting surface of the stamping die.

Thus, the interlaminar slipping is visible, in this example, on the edging of the blank which was supported by the comb-shaped support member and which edging has been brought to a melting temperature of the polymer making the matrix of the composite.

The blank is reconsolidated during a cooling and its thickness calibrated by the thickness of the air gap (850) between the punch (800) and the stamping die (400).

The punch can then be moved away from the stamping die and the stamped blank unmolded. This blank may then undergo a routing and various finishing operations to make a finished part.

Returning to FIG. 1, when the finished part, and therefore the blank, exhibit thickness variations, for instance as local reinforcements (110), it is primal that these reinforcement areas are correctly positioned with respect to the stamping die and the punch during the stamping operation.

The positioning bore holes (121, 122, 123, 124) of the blank, cooperating with the centering pins of the cleats, provide precise positioning of the reinforcement zones of the blank with respect to the transfer frame. The areas of the blank resting on the cleats not being brought to a melting temperature of the polymer making the matrix of the composite during the heating step, and therefore not being deconsolidated, such positioning is maintained until the blank is released from the transfer frame and rests on the resting surface of the stamping die.

When the blank is transferred onto the resting surface of the stamping die, the guiding pins attached to this stamping die, ensure the precise positioning of the blank relative to the stamping die, being inserted in the oblong slots (125, 126) of the blank which are also in a non-deconsolidated area of the blank.

Thus, any area of the blank comprising a thickness variation remains perfectly positioned during the installation of the blank on the transfer frame, during the heating step and during the transfer of the blank from the transfer frame onto the stamping die and then during stamping.

The invention claimed is:

1. A stamping apparatus comprising:
   a trimmed composite blank comprising continuous reinforcing fibers in a thermoplastic polymer matrix;
   a transfer frame configured to hold the trimmed composite blank along at least two edgings, the transfer frame comprising an open area between the at least two edgings of the trimmed composite blank;
   the transfer frame comprising at least one cleat comprising a bearing surface and two centering pins protruding from the bearing surface;
   the trimmed composite blank comprising two positioning bore holes on a first edging of the at least two edgings, the two centering pins being inserted in the two positioning bore holes when a portion of the first edging rests on the bearing surface, when the trimmed composite blank is held by the transfer frame;
   a stamping die and a punch movable with respect to the stamping die between an open position and a closed position, the closed position defining an air gap between walls of the stamping die and walls of the punch, the stamping die comprising at least two guiding pins protruding over a resting surface;
   the transfer frame further comprising connectors connecting the transfer frame to a a guide system for moving the transfer frame above the stamping die to a first position above the resting surface and a second position below the resting surface in which the trimmed composite blank rests on the resting surface;
   the first edging further comprising at least two oblong slots with a first oblong slot being located between the two positioning bore holes in the portion of the first edging, the at least two guiding pins being inserted in the at least two oblong slots when the trimmed composite blank rests on the resting surface;
   the trimmed composite blank comprising holding slots on a second edging of the at least two edgings;
   the transfer frame comprising a comb-shaped support member comprising a plurality of teeth forming a holding surface extending along the second edging of the at least two edgings and further comprising holding pegs protruding from ends of the teeth of the comb-shaped support member, the holding pegs being perpendicular to the holding surface and being inserted in the holding slots when the transfer frame holds the trimmed composite blank;

wherein:
a perimeter of the stamping die in a plane parallel to the resting surface is insertable in the open area of the transfer frame; and
the at least one cleat comprises a hinged thermal protection flap covering the portion of the first edging when the trimmed composite blank is held by the transfer frame.

2. The stamping apparatus of claim 1, wherein a thickness of the trimmed composite blank is equal to or greater than 10 mm.

3. The stamping apparatus of claim 1, wherein the trimmed composite blank comprises a thickness variation.

4. The stamping apparatus of claim 1, wherein a mass of the trimmed composite blank is greater than 5 kg.

5. The stamping apparatus of claim 1, wherein the hinged thermal protection flap is pushed away from the portion of the first edging by one of the at least two guiding pins inserted in the first oblong slot when the transfer frame moves from the first position to the second position.

6. The stamping apparatus of claim 1, wherein the transfer frame is made of an assembly of metal profiles and comprises a rail configured to hold the at least one cleat in an adjustable position on the rail.

7. The stamping apparatus of claim 6, wherein the at least one cleat comprises a platelet with a platelet thickness equal to a blank thickness of the first edging to fix the at least one cleat to the rail in the adjustable position.

* * * * *